Patented July 5, 1949

2,475,097

UNITED STATES PATENT OFFICE 2,475,097

PROCESS FOR THE PREPARATION OF SUBSTITUTION PRODUCTS OF 2:5-DIHYDROFURAN

David Gwyn Jones, Norton-on-Tees, England, assignor to Imperial Chemical Industries Limited, a corporation of Great Britain No Drawing. Application July 11, 1946, Serial No. 682,923. In Great Britain July 11, 1945

13 Claims. (Cl. 260—345)

This invention relates to the preparation of substitution products of 2,5-dihydrofuran.

We have found that by reacting furan and substituted furans with bromine or chlorine, and an organic hydroxyl-containing compound ROH, substitution products of the general formula:

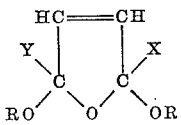

are obtained in which X and Y are substituents, selected for example from hydrocarbon, carboxyl and carboxylic ester groups, particularly aliphatic monocarboxylic esters. No olefinic groups should be present in the side chains. The process of the invention is of particular value in relation to the production of compounds of the above type in which X=Y=H.

Examples of substituent groups are as follows:

| X | Y |
|---|---|
| CH₃ | H |
| CH₃ | CH₃ |
| COOCH₃ | H |
| COOCH₃ | CH₃ |

The reaction proceeds smoothly at atmospheric temperature and pressure but higher temperatures and pressure may be employed if desired. Substitution of the halogen may occur if the temperature becomes too high, especially with chlorine, and it is therefore preferred to operate at temperatures up to the boiling point of the reactants at the operating pressure and preferably not much in excess of 100° C. The reactants will generally be employed in stoichiometric proportions, but an excess of the halogen may sometimes be used. It is also sometimes convenient to employ an excess of the organic hydroxyl containing compound to serve as reaction medium. The reaction may be represented for the case where furan, methanol and chlorine are reacted by the equation:

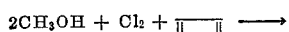

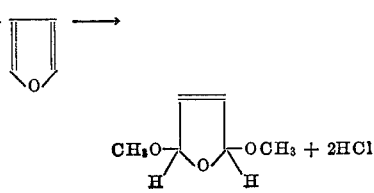

It is advantageous to conduct the reaction in the presence of a basic substance, e. g. sodium carbonate or calcium carbonate in order to neutralise the hydrogen halide formed during the reaction, which would promote a side reaction. If good yields of the desired products are to be obtained it is necessary to have a basic substance present. A sufficient amount of the basic substance should be present to keep the reaction mixture always alkaline.

Instead of chlorine or bromine, compounds such as, for example, tertiary butyl hypochlorite or bromonitro-methane, which yield halogen under the conditions of the reaction may be used, and instead of a hydroxyl containing compound, there may be used metal alcoholates such as for example sodium methoxide.

The reaction may be carried out in the presence of water, but it is preferable to work under initially substantially anhydrous conditions.

An organic solvent which is substantially inert to chlorine and/or bromine may be employed, and is preferably present when the hydroxyl-containing compound is a higher alcohol.

Examples of suitable solvents are tetrahydropyran, tetrahydrofuran, tetrahydrosylvan, chloroform and saturated chlorhydrocarbons.

The organic hydroxyl-containing compound may be mono- or di-hydric. Examples of suitable compounds are: the aliphatic mono-alcohols, particularly those containing up to 6 carbon atoms; phenol; tetrahydrofurfuryl alcohol; and furfuryl alcohol. An excess of the alcohol may be employed to serve as a reaction medium.

By the process of the invention the following compounds, which are all believed to be novel, were obtained: 2,5-dimethoxy-2,5-dihydrofuran, which has $d_4^{20}$ 1.073 and R. I. $n_D^{20}$ 1.4353, from furan and methanol; 2,5-dimethoxy-2,5-dihydrosylvan from sylvan and methanol; 2,5-dimethoxy-2,5-dimethyl-2,5-dihydrofuran from 2,5-dimethyl furan and methanol. The 2,5-dimethoxy-2,5-dihydrosylvan was characterised as the bis 2,4-dinitro phenylhydrazone of β-acetyl acrolein which crystallised in red needles from pyridine, had a melting point of 270° C. and contained 24.7% N (calculated 24.5%). The 2,5-dimethoxy-2,5-dimethyl-2,5-dihydrofuran was characterised as the bis 2,4-dinitro phenylhydrazone of diacetyl ethylene which crystallised in crimson needles from nitrobenzene and had a melting point of 200° C. (there was no depression of the melting point with an authentic sample).

The invention is illustrated but not limited by the following example.

Example 260 mls. of furan, 1800 mls. of methanol and 640 gms. of sodium carbonate were introduced into a flask and were well stirred. Stirring was continued and a stream of chlorine was passed into the mixture for 6 hours at the rate of 10 litres per hour, the temperature being maintained at 5–7° C. throughout. The reaction product was filtered and distilled under reduced pressure, and there was obtained 234 gms. of 2,5-dimethoxy-2,5-dihydrofuran, which is a colourless mobile liquid boiling at 67–69° C. at an absolute pressure of 20 mm. of mercury. This corresponded to a yield of 48% of theoretical.

I claim:

1. A method for the production of a dihydrofuran derivative of the formula

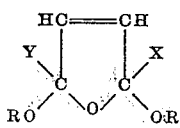

wherein X and Y are from the group consisting of hydrogen and saturated lower alkyl and lower alkyl carboxylic ester radicals and R is an alkyl radical containing less than 7 carbon atoms; comprising reacting a furan compound of the formula

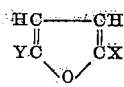

wherein X and Y have the significance designated above, with a halogen from the group consisting of chlorine and bromine and with a compound selected from the group consisting of aliphatic mono-alcohols containing less than 7 carbon atoms, at a temperature not substantially in excess of 100° C. and recovering said dihydrofuran derivative.

2. The method of claim 1 wherein the reaction is carried out in an alkaline reaction mixture.

3. The method of claim 2 wherein the reaction temperature is 5–100° C.

4. The method of claim 3 wherein the reaction is carried out in the presence of an organic solvent which is inert to chlorine and bromine.

5. The method of claim 1 wherein the reaction is carried out in a substantially anhydrous alkaline reaction mixture, and the reaction temperature is 5–100° C.

6. The method of claim 1 wherein the reaction is carried out in an alkaline reaction mixture, and furan and methanol are two of the reactants.

7. The method of claim 1 wherein the reaction is carried out in an alkaline reaction mixture, and sylvan and methanol are two of the reactants.

8. The method of claim 1 wherein the reaction is carried out in an alkaline reaction mixture, and 2,5-dimethyl furan and methanol are two of the reactants.

9. A dihydrofuran derivative of the formula

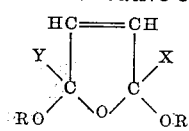

wherein X and Y are from the group consisting of hydrogen and saturated lower alkyl and lower alkyl carboxylic ester radicals, and R is an alkyl radical containing less than 7 carbon atoms.

10. A 2,5-dialkoxy-2,5-dihydrofuran compound of the formula

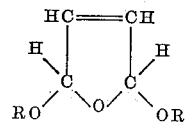

wherein R is an alkyl radical containing less than 7 carbon atoms.

11. 2,5-dimethoxy-2,5-dihydrofuran.

12. 2,5-dimethoxy-2,5-dihydrosylvan.

13. 2,5-dimethoxy-2,5-dimethyl - 2,5 - dihydrofuran.

DAVID GWYN JONES.

No references cited.